United States Patent
Rhoads et al.

(10) Patent No.: US 9,710,786 B2
(45) Date of Patent: Jul. 18, 2017

(54) SYSTEMS AND METHODS FOR MANAGING DOCUMENTS FOR LAW FIRMS

(75) Inventors: Forrest Rhoads, North Oaks, MN (US); Trace Liggett, Rosemount, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

(21) Appl. No.: 13/406,331

(22) Filed: Feb. 27, 2012

(65) Prior Publication Data

US 2012/0158781 A1    Jun. 21, 2012

Related U.S. Application Data

(63) Continuation of application No. 10/751,269, filed on Dec. 30, 2003, now Pat. No. 8,126,818.

(60) Provisional application No. 60/437,169, filed on Dec. 30, 2002, provisional application No. 60/480,476, filed on Jun. 19, 2003.

(51) Int. Cl.
*G06F 17/30* (2006.01)
*G06Q 10/10* (2012.01)
*G06Q 50/18* (2012.01)

(52) U.S. Cl.
CPC ............. *G06Q 10/10* (2013.01); *G06Q 50/18* (2013.01); *G06Q 50/184* (2013.01)

(58) Field of Classification Search
CPC ................................ G06F 17/30; G06F 17/00
See application file for complete search history.

(56) References Cited

U.S. PATENT DOCUMENTS

| | | | |
|---|---|---|---|
| 5,157,783 A | | 10/1992 | Anderson et al. |
| 5,265,065 A | | 11/1993 | Turtle |
| 5,418,948 A | | 5/1995 | Turtle |
| 5,434,932 A | | 7/1995 | Scott |
| 5,488,725 A | | 1/1996 | Turtle et al. |
| 5,497,317 A | | 3/1996 | Hawkins et al. |
| 5,644,720 A | | 7/1997 | Boll et al. |
| 5,794,236 A | * | 8/1998 | Mehrle |
| 5,815,392 A | | 9/1998 | Bennett et al. |
| 5,832,494 A | | 11/1998 | Egger et al. |
| 5,859,972 A | | 1/1999 | Subramaniam et al. |
| 5,875,431 A | | 2/1999 | Heckman et al. |
| 5,991,751 A | * | 11/1999 | Rivette ............ G06F 17/30716 |

(Continued)

FOREIGN PATENT DOCUMENTS

| | | |
|---|---|---|
| AU | 2002301438 B2 | 9/2006 |
| NZ | 228136 A | 4/1991 |

(Continued)

OTHER PUBLICATIONS

International Search Report for Application No. PCT/US03/41708, mailed Nov. 24, 2004, 8 pages.

(Continued)

*Primary Examiner* — Farhan Syed
(74) *Attorney, Agent, or Firm* — Norton Rose Fulbright US LLP

(57) ABSTRACT

The present inventors devised unique systems, methods, interfaces, and software for managing and leveraging knowledge in law firms and potentially other enterprises. For example, one system provides a single user interface for researching case law for online legal research service and identifying and accessing law-firm documents.

12 Claims, 2 Drawing Sheets

(56) References Cited

U.S. PATENT DOCUMENTS

| | | | |
|---|---|---|---|
| 6,009,428 A | 12/1999 | Kleewein et al. | |
| 6,556,992 B1* | 4/2003 | Barney | G06Q 10/10 |
| 6,662,178 B2* | 12/2003 | Lee | G06F 17/30011 |
| 6,694,331 B2* | 2/2004 | Lee | G06F 17/30011 707/706 |
| 6,738,760 B1 | 5/2004 | Krachman | |
| 6,772,149 B1* | 8/2004 | Morelock | G06F 17/30675 |
| 7,062,498 B2* | 6/2006 | Al-Kofahi | G06F 17/30707 |
| 7,315,841 B1* | 1/2008 | McDonald et al. | 705/38 |
| 7,412,463 B2 | 8/2008 | Mitchell et al. | |
| 7,529,756 B1* | 5/2009 | Haschart | G06F 17/30728 |
| 7,571,174 B2* | 8/2009 | Arumainayagam et al. | |
| 7,580,939 B2* | 8/2009 | Al-Kofahi | G06F 17/30707 |
| 7,698,298 B2* | 4/2010 | Ciaramitaro et al. | 707/999.107 |
| 7,716,103 B1* | 5/2010 | Donner | G06Q 10/10 705/30 |
| 7,730,113 B1* | 6/2010 | Payette | G06Q 10/00 707/821 |
| 7,778,954 B2* | 8/2010 | Rhoads | G06F 17/30728 715/713 |
| 7,797,336 B2* | 9/2010 | Blair | G06F 17/30011 707/773 |
| 7,831,437 B2* | 11/2010 | Bennett et al. | 705/311 |
| 8,001,129 B2* | 8/2011 | Arumainayagam et al. | |
| 8,126,818 B2* | 2/2012 | Rhoads | G06Q 10/10 705/310 |
| RE43,391 E* | 5/2012 | Costin et al. | 707/760 |
| 8,185,560 B2* | 5/2012 | Arumainayagam et al. | 707/803 |
| 8,196,061 B1* | 6/2012 | Bhojan | 715/787 |
| 2001/0037460 A1* | 11/2001 | Porcari | G06F 17/30011 726/28 |
| 2002/0019741 A1* | 2/2002 | Heston | G06Q 10/10 705/34 |
| 2002/0049705 A1* | 4/2002 | Haviv-Segal | G06N 5/025 |
| 2002/0055932 A1 | 5/2002 | Wheeler et al. | |
| 2002/0087597 A1 | 7/2002 | Wilson | |
| 2002/0138465 A1 | 9/2002 | Lee | |
| 2002/0143760 A1 | 10/2002 | Kim et al. | |
| 2002/0147745 A1* | 10/2002 | Houben | G06F 17/272 715/234 |
| 2002/0165856 A1* | 11/2002 | Gilfillan | G06F 17/30864 |
| 2003/0046277 A1* | 3/2003 | Jackson | G06F 17/3061 |
| 2003/0101181 A1* | 5/2003 | Al-Kofahi | G06F 17/30707 |
| 2003/0144969 A1 | 7/2003 | Coyne | |
| 2004/0095378 A1 | 5/2004 | Vigue et al. | |
| 2004/0193943 A1 | 9/2004 | Angelino et al. | |
| 2005/0010605 A1* | 1/2005 | Conrad et al. | 707/104.1 |
| 2005/0149343 A1* | 7/2005 | Rhoads et al. | 705/1 |
| 2005/0203899 A1* | 9/2005 | Anderson et al. | 707/5 |
| 2005/0228788 A1* | 10/2005 | Dahn | G06F 17/3066 |
| 2006/0195430 A1* | 8/2006 | Arumainayagam et al. | 707/3 |
| 2008/0059435 A1* | 3/2008 | Steensgard | 707/3 |
| 2009/0076836 A1* | 3/2009 | Arvidson et al. | 705/1 |
| 2009/0150827 A1* | 6/2009 | Meyer et al. | 715/810 |
| 2010/0268708 A1* | 10/2010 | Zhang et al. | 707/726 |
| 2010/0312764 A1* | 12/2010 | Liao et al. | 707/723 |
| 2011/0191335 A1* | 8/2011 | Miller et al. | 707/728 |
| 2012/0005155 A1* | 1/2012 | Lynch | G06F 17/30011 707/608 |
| 2012/0036077 A1* | 2/2012 | Quinn, Jr. | 705/310 |
| 2012/0089640 A1* | 4/2012 | Arumainayagam et al. | 707/770 |
| 2012/0158781 A1* | 6/2012 | Rhoads et al. | 707/770 |
| 2012/0323880 A9* | 12/2012 | Al-Kofahi | G06F 17/30722 707/708 |

FOREIGN PATENT DOCUMENTS

| | | |
|---|---|---|
| NZ | 280973 A | 2/1997 |
| NZ | 298861 A | 1/1999 |
| NZ | 293197 A | 1/2000 |
| NZ | 336782 A | 1/2000 |
| NZ | 503065 A | 8/2001 |
| NZ | 507194 A | 5/2002 |
| WO | WO-97/12334 A1 | 4/1997 |
| WO | WO-98/55945 A1 | 12/1998 |
| WO | WO-00/43918 A2 | 7/2000 |
| WO | WO-00/67162 A1 | 11/2000 |
| WO | WO-00/77690 A1 | 12/2000 |
| WO | WO-01/33349 A2 | 5/2001 |
| WO | WO-01/33387 A2 | 5/2001 |
| WO | WO-01/67282 A2 | 9/2001 |
| WO | WO-01/82117 A1 | 11/2001 |
| WO | WO-02/01323 A2 | 1/2002 |
| WO | WO-02/29623 A1 | 4/2002 |
| WO | WO-02/31738 A1 | 4/2002 |
| WO | WO-02/44932 A2 | 6/2002 |

OTHER PUBLICATIONS

D'Agostini Bueno, T.C., et al. "Juris Consulto: Retrieval in Jurispredencial Text Bases using Juridial Terminology", *Proceedings of the Seventh International Conference on Artificial Intelligence and Law*, Oslow, Norway, (1999), 147-155.

Canadian Application Serial No. 2,512,488, Office Action mailed Nov. 5, 2008.

New Zealand Application Serial No. 541580, Examination Report received Jun. 16, 2008.

International Application Serial No. 03800400.8, Supplementary European Search Report mailed Mar. 6, 2008.

International Application No. 2512488, Office Action mailed Sep. 11, 2007.

International Application Serial No. 541580, Examination Report mailed Aug. 30, 2006.

International Application Serial No. 541580, Examination Report mailed Feb. 27, 2008.

International Application Serial No. 541580, Examination Report mailed Sep. 24, 2008.

Australian Application, Serial No. 2003300142, Search Report mailed on Feb. 27, 2009.

"Knowledge Management in a Law Firm," Upgrade, vol. III, No. 1, Feb. 2002, pp. 51-55.

"KnowMaw: Every Lawyer's Dream—The KM Portal," Computers and Law, vol. 11, No. 5, Dec. 2000-Jan. 2001, pp. 9-11.

"Entwicklungen bei Patentdatenbanken;" NfD, pp. 331-34—(1995).

English translation of "Entwicklungen bei Patentdatenbanken" above.

Canadian Application No. 2,512,488 Office Action mailed Oct. 28, 2009 (9 pages).

Japanese Application No. 2005-508649 Office Action mailed Nov. 17, 2009 together with English translation (10 pages).

First Amended Notice of Opposition in New Zealand to Grant of Patent dated Sep. 28, 2009 (13 pages).

Notice of Opposition in New Zealand to Grant of Patent dated Jul. 27, 2008 (1 page).

Takashi Nemoto, "E-Personnel Development," first edition, Chuokeizai-Sha, Inc., Tokio Yamamoto, May 20, 2002, pp. 97; together with a certified English translation prepared by Kevin Kelley.

European Application Serial No. 03800400.8, Office Action mailed May 25, 2009.

Beresford & Co.'s letter of Mar. 23, 2010 with enclosures of original claims as well as a marked up version (11 pages).

* cited by examiner

SYSTEMS AND METHODS FOR MANAGING DOCUMENTS FOR LAW FIRMS

RELATED APPLICATIONS

This application is a continuation of U.S. patent application Ser. No. 10/751,269, now U.S. Pat. No. 8,126,818 issued on Feb. 28, 2012, which claims priority to U.S. Provisional Patent Application 60/437,169, which was filed on Dec. 30, 2002 and to U.S. Provisional Patent Application 60/480,476, which was filed on Jun. 19, 2003. Each of these applications is incorporated herein by reference in its entirety.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2002, Thomson Legal & Regulatory, Inc.

TECHNICAL FIELD

Various embodiments of the present invention concern information retrieval systems and knowledge-management systems, particularly such systems in a legal-research or law-firm context.

BACKGROUND

The American legal system, as well as some other legal systems around the world, rely heavily on written judicial opinions, the written pronouncements of judges, to articulate or interpret the laws governing resolution of disputes. As a consequence, judges and lawyers within our legal system are continually researching an ever expanding body of past opinions, or case law, for the ones most relevant to resolution or prevention of new disputes. Found cases are studied for relevance and are ultimately cited and discussed in documents, called work product, which, for example, advocate court action, counsel clients on likely court actions, or educate clients and lawyers on the state of the law in particular jurisdictions.

Over time, law firms, particularly large one with scores of lawyers and hundreds of clients, amass large collections of work product. In attempting to manage and leverage the value of these collections, many law firms in the last decade or so have sought to use knowledge-managements systems.

Most, if not all, of these systems have been built around document-management systems (DMSs) that assist in storing, indexing, and searching law-firm documents. The indexing and searching capability of these systems allows lawyers to reuse some of their work product, and thus have in some instances enhanced the efficiency of lawyers in developing new work product.

However, the present inventors have recognized that centering a law firm's knowledge management on document-management systems presents at least two problems. First, the document collections in these systems are generally undisciplined in the sense that they include multiple versions of the same document, non-legal documents, and so forth. Thus, searches in the DMS collections often turn up marginally relevant documents or draft documents that frustrate efforts to quickly identify the high-quality finished documents most likely to have reusable content. Second, even when apparently reusable documents are found, it is necessary for lawyers or other highly trained personnel to assess not only whether their legal arguments are of high quality, but also whether their supporting case law has been overruled, weakened, or otherwise affected by newer case law or other legal developments. (Even with online legal research services, such as the Westlaw online service, that allow one to check the validity of case law on a case-by-case basis,) this assessment is generally time consuming and thus offsets the efficiency gains of reusing work product.

Accordingly, the present inventors have identified a need for better systems, tools, and methods of managing and leveraging the accumulated knowledge within law-firm document collections.

SUMMARY

To address this and/or other needs, the present inventors have devised unique systems, methods, interfaces, and software for managing and leveraging knowledge in law firms and potentially other enterprises. For example, one system provides a single user interface for researching case law for online legal research service and identifying and accessing law-firm documents. The interface allows a user, such as an attorney, to initiate or submit a legal research query and view search results that identify not only relevant external documents from the online legal research service, but also relevant internal documents, such as briefs, client letters, and legal memoranda, from the law firm's own document collection.

Moreover, in this exemplary system, the external and internal documents are displayed with validity indicators, such as color-coded icons, that indicate whether cases they cite are still valid law, enabling the attorney to more readily assess the strength or weakness of each identified document.

Notably, the exemplary embodiment provides a seamless integration of the internal and external documents, yet the internal documents never leave the security of the law firm firewalls.

DETAILED DESCRIPTION OF EXEMPLARY EMBODIMENTS

The following description, which incorporates the figures and the appended claims, describes and/or illustrates one or more exemplary embodiments of one or more inventions. These embodiments, offered not to limit but only to exemplify and teach the invention(s), are shown and described in sufficient detail to enable those skilled in the art to make and use the invention(s). Thus, where appropriate to avoid obscuring the one or more inventions, the description may omit certain information known to those of skill in the relevant art.

Exemplary Information System

Figure 1:
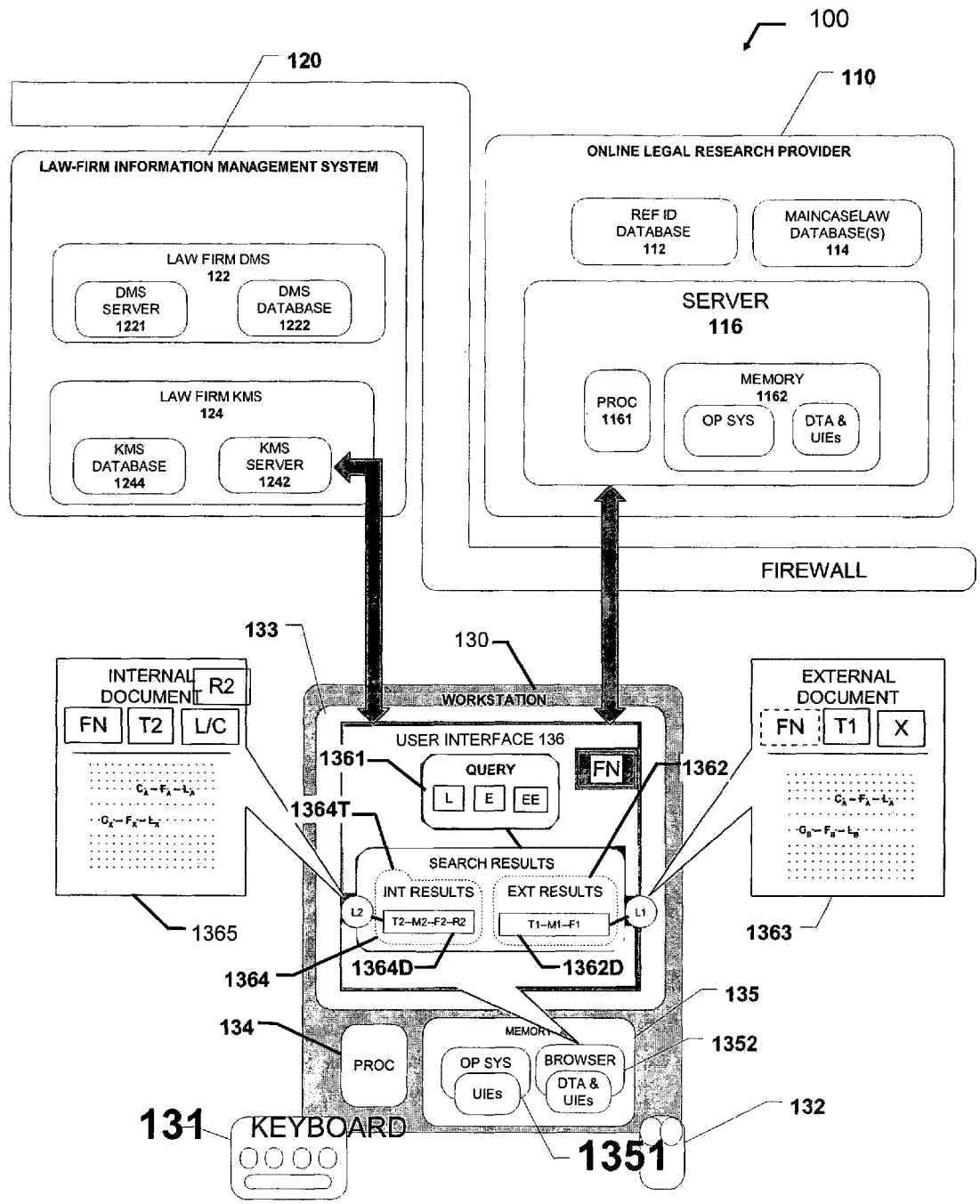
FIG. 1 is a block diagram of an exemplary information system 100 corresponding to one or more embodiments of the present invention.

FIG. 1 depicts an exemplary information retrieval and knowledge management system 100 that incorporates one or more teachings of the present invention. System 100 includes a commercial online legal-data (or research) provider 110, a law-firm information-management system 120, and a client access device 130.

Specifically, commercial online legal data (or research) provider 110 includes main databases 112, reference identification database 114, and server 116. In the exemplary embodiment, main databases 112 contain a wide variety of legal documents, including for example, case law (judicial opinions), legislation, and journal articles. Reference identification database 114 includes a list of document identifiers and corresponding citations, with each document identifier and citation corresponding to a document within main databases 112. Databases 112 are coupled to server 116.

Server 116, representative of one or more servers, includes a processing unit 1161, and a memory 1162. Memory 1161, which can take the form of an electronic, magnetic, or optical computer- (or machine-) readable medium, includes one or more one or more search engines, and other modules and software, such as browser-compatible user-interface elements (UIEs) for receiving and fulfilling queries from clients.

In the exemplary embodiment, server 116 serves active or dynamic content in the form of hypertext markup language (HTML), extensible markup language (XML), or more generally a markup-language, documents or pages. To this end, the exemplary server supports the following web services or protocols: TCP/IP, SOAP (HTTP, HTML, XML), and UDDI. Additionally, the UIEs of server 116 include one or more Java scripts, applets, or other related software and data structures for serving data in association with desired interactive control or user-interface features, objects, modules, or elements. (In some embodiments, the HTML pages include URL or other embedded instructions that include one or more portions of queries submitted from an access device, such as access device 130.) These features work in conjunction with client processor and software platforms to define one or more portions of a browser-based graphical user interface for legal research. Server 116 is coupled or couplable, for example, via an Internet Protocol (IP) network, to law-firm information-management system 120.

Law-firm information-management system 120 includes a document-management subsystem 122, and a knowledge-management subsystem 124. Document-management subsystem (DMS) 122 includes a DMS database server 1221 and a DMS database 1222. DMS database 1222 includes internal firm work-product documents, such as briefs, legal memorandum, opinions, letters, and multiple versions of same in multiple stages of completion. It may also include non-legal materials. The contents of the DMS database are generally associated with metadata profiles indicating authors, creation dates, update dates, client numbers, security settings, access restrictions and so forth.

Knowledge management subsystem (KMS) 124 includes a KMS server 1242 and a KMS database (or document repository) 1244. KMS server 1242, which may present one or more servers depending on loading and performance issues, includes a full-text index module, an engines-and-applications module, an HTML library module, a metadata database module, a citation index module, and a usage-and-tracking module, all of which are not shown as separate items in FIG. 1.

In the exemplary embodiment, full-text-indexer module is used to facilitate general retrieval of documents from KMS database by indexing documents and/or providing index data. Engines-and-applications module includes the following engines and applications: citation-identification engine, full-text search engine, KeyCite Flags engine (see appendix for further details); scheduler application for handling migrating documents from DMS database, DMS integration components, and system administration tools.

HTML library module stores HTML version of each document contained in the research repository, including KeyCite flags and tags. Metadata database module 1242D stores descriptive information and attributes of documents contained in the KMS database, includes information from the DMS database. Citation index module indexes the citations relationships between documents to maintain flags and tags on citations. And, usage-tracking database stores and maintains a historical log of all search and retrieval activity containing detail information by document name, author, area of law, and user ID.

KMS database stores a selected set of high-quality internal work-product documents. In the exemplary embodiment, these documents are copies of documents selected from DMS database 1222. When copied into KMS database 1244, one or more portion of the metadata profile data is also incorporated into KMS database.

Law-firm information-management system 120 and online legal-research provider 110 are both communicatively coupled or couplable, via a local-area network (such a corporate intranet) or wide-area network (such as the Internet) to access device 130.

Access device 130, which is generally representative of one or more access devices within a business organization, such as a law firm, takes the exemplary form of a workstation. In addition to a keyboard 131 (lower left hand corner), a mouse (graphical pointer) 132, and a display 133, access device 130 includes a processing unit 134, a memory module 135, and a browser-compatible legal-research interface 136.

More particularly, processing unit 134 includes at least one processing circuit. Memory module 135, which takes the form of one or more electronic, magnetic, optical machine-readable mediums, includes operating system 1351, a browser application 1352, and a word processor application 1353.

Operating system 1351, which cooperates with processing unit 134 and takes the exemplary form of the Microsoft Windows operating system, includes a set of user-interface objects, modules, or elements, accessible via application programs such as browser application 1352. Browser application 1352 takes exemplary form of a Microsoft Internet Explorer™ or Netscape Navigator browser, cooperates with operating system 1351 and externally provided data, coded instructions (collectively UIEs) from servers such as (external legal-research) server 116 and internal KMS server 1242, to define and render, on display 133, browser-compatible legal research interface 136.

Legal-research interface 136 includes a query portion 1361, an external re-results portion 1362, an external document display portion 1363, an internal-results portion 1364, and an internal document display portion 1365. In the exemplary embodiment, portions 1361-1365 are not necessarily displayed or accessed simultaneously. For example, the interface can include tabs and full-screen-display options that enable the user to focus the display on particular portion of the data or interface portions. One embodiment provides one folder tab to invoke display of a combined listing of internal and external results with corresponding indicators to distinguish internal results from external ones and the other to invoke display of internal results only.

Query portion 1361 includes a label portion L and one or more associated interactive user-interface (UI) elements (objects, features, or widgets), E and EE (referred to hereinafter as label portion 1361L, and elements 1361E and 1361EE.) Label portion 1361L is defined to display a query-indicator label, such as "Search Based on this New Citation," "KeyCite this Citation, or "Search these Databases," to indicate to a user that some form of query input is expected within this portion of the interface. UI element 1361E accepts input from a user. In the exemplary embodiment, this UI element takes the form of a text box or menu, with the menu enabling the use to select a target for the query, such as the KMS database. As a default, the exemplary embodiment will run the query against the KMS database in combination with any other database set that is selected. (Some embodiments provide a set of UI elements that enable the user to select from a number of predefined category- or subject-matter-specific queries. The queries are defined, for example, by expert legal researches in the specific legal areas. A hierarchical organization or outline of the queries facilitates user selection of the appropriate query by the user. The user may also view the details of the predefined queries and modify as desired prior to submission.)

UI element 1361EE allows a user to initiate submission and execution of a query defined via user-interface element 1361E. The exemplary embodiment provides this feature in the form of a "go" button, which upon actuation results in transmission of the defined query (or relevant portion of it) to not only main database 112 (server 116), but also to KMS database XYX for fulfillment. (In some embodiments, the query is submitted only to KMS database XYX.)

External-results portion 1362 is defined to display search results obtained or received from online legal-research provider 110, or more precisely its main database 112. In the exemplary embodiment, external-results portion 1362 includes one or more document identifiers or descriptors 1362D which are displayable in association with corresponding user-interface element L1. Descriptor 1362D provides information regarding a corresponding external-results document within database 112. In the exemplary embodiment, this information includes a title T1, metadata M1, and a case validity flag F1. UI element L1, for example a hyperlink, provides an option which can be invoked for example, by clicking, to retrieve and display the document(s) associated with descriptor 1362D, as indicated by document display 1363.

Document display 1363, which in some embodiments is presented in a spit-screen along a listing of the internal and/or external results, displays at least a portion of the external document associated with UI element L1. The document includes text (denoted by the broken lines) and legal citations CA and CB, which are respectively associated with case-validity flags FA and FB and hyperlinks LA and LB. Selection of hyperlinks LA and LB all a user retrieve the documents corresponding to the citations from online legal-research provider 110.

Internal-results portion 1364 is defined to display results of querying internal firm database, KMS database 1244. In the exemplary embodiment, internal-results portion 1364 includes one or more sets of document-specific UI elements, such as UI element set 1364D, one or more of which are displayable in association with a corresponding UI element L2. Each UI-element provides data or access to data about the contents of an associated internal-results documents, such as a document title T2, metadata M2, case-law validity flag F2, and law-firm rating R2.

More precisely, metadata M2 includes one or more portion of the metadata associated with the original DMS copy of the identified document. (The exemplary embodiment populates KMS database with copies of documents selected from DMS database.) In the exemplary embodiment, this includes author, client, document ID, dates of creation and revision, etc. Case-law validity flag F2 provides an indication of the validity of case law cited within the corresponding firm document. Law-firm rating R1 provides an indication of the utility and/or quality of the document as determined by previous law-firm users of the document.

UI element L2, similar to UI element L1, provides a user option to retrieve and display the internal document(s) associated with descriptor 1364D. Exercising this option results in a display document display 1365.

Document display 1365, which in some embodiments is presented in a spit-screen along a listing of the internal and/or external results, displays at least a portion of the internal document associated with UI element L2. The document includes text (denoted by the broken lines) and legal citations CA and CX, which are respectively associated with case-validity flags FA and FB and hyperlinks LA and LX. In addition to providing a visual indication of case-law validity, the case-validity flags can be selected in some embodiments to cause retrieval and/or display of further information regarding the nature of the flags. Hyperlinks LA and LX all a user retrieve the documents corresponding to the citations from online legal-research provider 110. In addition to the text and citations, document display 1365 provides a firm-name label FN to clearly identify the document as an internal law firm document, a title label T2 for indicating the title of the corresponding internal document, and a load-copy UI element LC for enabling user to initiate loading of a copy of the corresponding internal document directly into a word processor application of access device 130 for use in generating a new work product document. Moreover, document display portion 1365 also includes a ratings UI-element R1 which enables a user to see the current law-firm-user rating of the document as well as to rate the current document. Figure X shows an exemplary set of UI elements for achieving this rating.

Exemplary Method of Operation

Figure 2:
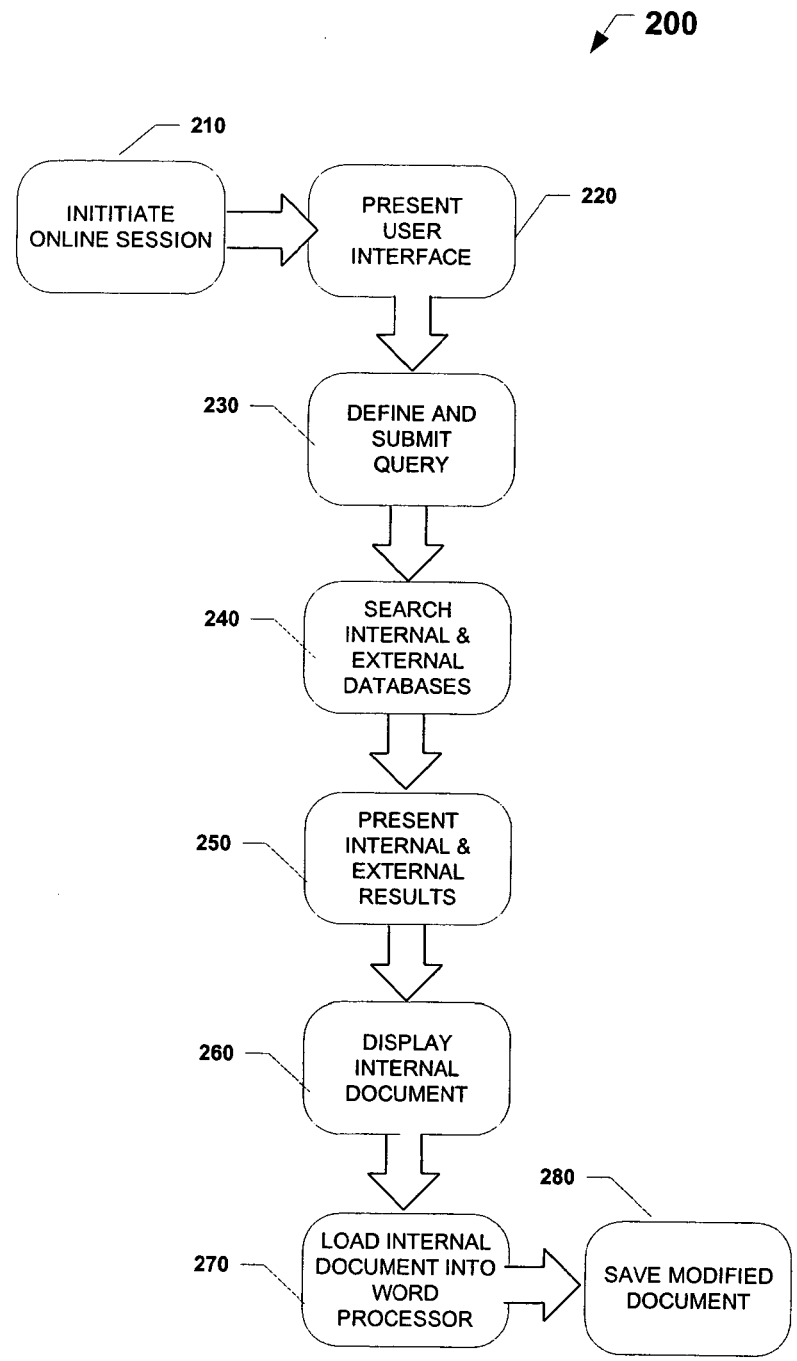
FIG. 2 is a flow chart corresponding to one or more exemplary methods of operating an information system and associated components that embody the present invention.

FIG. 2 shows a flow chart 200 of one or more exemplary methods of operating an information-management system, such as system 100. Flow chart 200 includes blocks 210-280, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with a law-firm user, such as an attorney or paralegal, initiating a search session with online legal-research system 110. In the exemplary embodiment, this entails the user at access device 130 logging onto a law-firm network using security measures, such as an assigned username and password. After login, the user then launches and directs the Internet browser within access device 130 to connect to the online legal research system. In some embodiments, the user enters a separate username and password to initiate the search session, and in others the previous network login suffices. Execution continues at block 220.

Block 220 entails displaying or otherwise loading and presenting one or more portions of legal-research user interface 136. In the exemplary embodiment, this entails server 116 of online legal-research system 110 sending an HTML document (or webpage) that includes scripts, applets, and associated data for causing access device 130 to display query portion 1361 of user interface 136. For users at law firms that have a knowledge management system, such as management system 100, which is provided or authorized by the online legal research system, the associated data includes at least one firm-name label to use in labeling specific portion of the user interface as well as the name of KMS server 1242, which is configured and/or authorized to access KMS database 1244. Execution continues at block 230.

Block 230 entails the user defining and submitting a query. In the exemplary embodiment, this entails the user defining a query using query portion 1361 of interface 136. Query portion includes features, such as a text box or pull-down menus that enable the user to define a citation, natural-language, or terms-and-connectors query. The interface also presents the user an option to specify the scope of the search or query as including one or more databases within online legal research system and/or at least one internal law firm database. Options related to identifying the internal law firm databases are labeled based on the firm-name label provided by the online legal research system. After defining the query, the user submits it to system by actuating a UI element, such as a "go" button, using an input device, such as a mouse or keyboard. The query is then communicated over the Internet to server 116 and KMS server 1242.

Block 240 entails searching databases at one or both of the online legal search system and the law-firm information management system based on the submitted query. In the exemplary embodiment, online legal-search system 110, or more precisely, server 116 executes or causes execution of the query against the requested databases, and returns results the search (external results) to access device 130 in the form of HTML documents with associated control features and data. If the query was defined to include law-firm databases, an applet, script or other device is returned along with the external results of access device 130 to trigger or cause access device to call KMS server 1242 to execute the query against an internal law-firm database, such as KMS database 1244. Some embodiments may call the KMS server concurrently with submission of a query identifying an internal law-firm database. In any case, KMS server executes the search against the KMS databases and serves results in the form of a mark-up language document, such as HTML, to access device 130. Execution of the exemplary method continues at block 250.

Block 250 entails presenting the search results. In the exemplary embodiment, this presentation entails presenting the internal results and the external results via the browser interface in association with one or more sets of UI elements (or interactive control features), as shown in FIG. 1.

Block 260 entails displaying an internal law-firm document from internal results set. In the exemplary embodiment, this entails the user selecting a UI element, such a link, associated with one of the listed internal documents and the KMS server retrieving the document from the KMS database and serving it to the access device. Notably, the KMS server automatically updates the document to the current state of the law—that is, current validity flags are inserted next to all of the authorities in the document. The KMS server requests these from the online legal-research provider—in real time—an inserts them prior to serving up the pages to the access device. Another feature of this interface allows the use to click on an UI element and move the mouse cursor to each place in the document that contained terms from the search, for example, a citation in the case of a citation search.

Block 270 entails loading the displayed internal document into a word-processing application program. In the exemplary embodiment, this entails the user selecting a "load copy" icon LC on the internal-document display portion 1365 of interface 136. In response, user interface 136, which includes an appropriate application program interface, launches or otherwise communicates with the word-processing application to load the document from interface 136 into the word-processing application for user modification. In response, tracking system data within KMS server 1242 is also updated to reflect usage of this internal document. (The exemplary system generally tracks everytime a user clicks on something, specifically creating a usage record indicating the date, time, user, client-mater, type of transaction.)

Block 280 saves the modified copy of the internal document in the DMS database as a new work product document. In the exemplary embodiment, this entails the user also providing metadata profile data for the new document.

Exemplary Method of Building the Research Repository

In the exemplary system of FIG. 1, knowledge-management subsystem 120 includes KMS database 1244, which serves as a research repository of documents selected from DMS database 1224. KMS server 1242 includes software (that is, coded instructions) for automatically migrating or mirroring select documents from film's DMS or network file system to the KMS database 1242.

In the exemplary embodiment, this migration process initially entails retrieving one or more documents from DMS database, for example, using administrator defined queries and executing those queries on a scheduled basis or event-driven basis. Next, the exemplary method entails converting the retrieved documents into a markup language, such as HTML, subsequently indexing the converted documents based on citations and text. The next series of operations include storing citation relationships, storing the HTML documents with tagged citations, and storing document profile data all in a relevant portion of the KMS server.

The invention claimed is:

1. A system for a knowledge management system comprising:
   a processor; and
   a memory that contains instructions that are readable by the processor and cause the processor to:
   receive a query that indicates at least one legal topic from a hierarchy of legal topics;
   provide a response to the query indicating each work-product document and each case law document that matches the at least one legal topic, wherein the processor is operable to, prior to providing the response:
   retrieve each work-product document that matches the at least one legal topic from a first database; and
   retrieve each case law document that matches the at least one legal topic from a second database;

determine a validity status of at least one case cited within each work-product document, resulting in a validity indicator, the validity indicator for each work-product document indicating the validity status of the at least one case;

indicate, in the response provided to the query, a reliability of each work-product document using the validity indicator and a rating indicator for each work-product document, the rating indicator for each work-product document indicating a user rating of each work-product document based on previous users of each work-product document;

index each work-product document according to the hierarchy of legal topics based on at least one legal citation and a set of text;

index each case law document according to the hierarchy of legal topics;

receive a second query for a particular case law document; and provide a second response to the second query indicating each work-product document which includes at least one legal citation associated with the particular case law document according to a depth-of-treatment value, the depth-of-treatment value indicates a degree to which each work-product document evaluates the particular case law document.

2. The system recited in claim 1, wherein the query is an enterprise search query.

3. The system recited in of claim 1, wherein the first and second databases are separated by a firewall.

4. The system recited in claim 1, wherein the degree to which each work-product document is evaluated is based on at least a count that each legal citation references the particular case law document.

5. The system recited in claim 4, wherein, each work-product document and each case law document is associated with a respective date, wherein, the second response is organized according to the depth-of-treatment value and a chronological order based on the respective date.

6. The system recited in claim 1, wherein the processor further converts the work-product document into a markup language.

7. The system recited in claim 1, wherein the query is received from an agent of a law firm, via a user-device, wherein each work-product document comprises internal law-firm content including at least one of briefs, client letters and legal memoranda.

8. The system recited in claim 1, wherein, each work-product document and each case law document is associated with a respective date, wherein, each work-product document and non-work product document that matches the at least one legal topic indicated by the response, is organized according to a chronological order based on the respective date.

9. The system recited in claim 1, wherein the processor is further operable to:

provide the hierarchy of legal topics for display on a user-device; and indicate a number of work-product documents associated with each legal topic of the hierarchy of legal topics.

10. The system recited in claim 1, wherein each work-product document is associated with an indicator that identifies an author of the work-product document and an office location of the author.

11. A tangible, non-transitory, computer-readable media having software encoded thereon, the software, when executed by a processor, operable to:

index at least one work-product document from a law firm according to a hierarchy of legal topics based on at least one legal citation and at least a set of text corresponding to the at least one work-product document, each legal citation further associated with a case law document having legal precedence;

receive a query that indicates at least one legal topic from the hierarchy of legal topics;

provide a response to the query indicating each work-product document that matches the at least one legal topic and each case law document associated with each legal citation corresponding to each work-product document, wherein the software is operable to, prior to providing the response:

retrieve each work-product document that matches the at least one legal topic from a first database; and retrieve each case law document associated with each legal citation from a second database;

determine a validity status of each case law document associated with each legal citation corresponding to each work-product document, resulting in a validity indicator;

indicate, in the response provided to the query, a reliability of each work-product document using the validity indicator and a rating indicator, the rating indicator indicating a user rating of each work-product document based on previous users of each work-product document;

receive a second query for a particular case law document; and provide a second response to the second query indicating each work-product document which includes the at least one legal citation associated with the particular case law document according to a depth-of-treatment value, the depth-of-treatment value indicates a degree to which each work-product document evaluates the particular case law document.

12. A method for facilitating a knowledge management system comprising:

receiving at least one work-product document from a law firm, each work-product document including at least one legal citation and at least a set of text, the at least one legal citation associated with a non-work-product document having legal precedence;

indexing each work-product document according to a hierarchy of legal topics based on the at least one legal citation and the set of text;

indexing each non-work-product document associated with the at least one legal citation included in each work-product document according to the hierarchy of legal topics;

generating a validity indicator that indicates a validity status of the legal precedence for each non-work-product document associated with the at least one legal citation included in each work-product document;

generating an indicator that indicates a user rating of each work-product document based on previous users of each work-product document;

receiving a query that indicates at least one legal topic of the hierarchy of legal topics; and providing a response to the query indicating each work-product document and non-work-product document that matches the at least one legal topic, the response indicating a reliability of each work-product document using the validity indicator for each non-work-product document and the rating indicator for each work-product document, wherein providing the response includes:
retrieving each work-product document that matches the at least one legal topic from a first database; and
retrieving each non-work-product document that matches the at least one legal topic from a second database;
receiving a second query for a particular non-work-product document; and
providing a second response to the second query indicating each work-product document which includes at least one legal citation associated with the particular non-work-product document according to a depth-of-treatment value, the depth-of-treatment value indicates a degree to which each work-product document evaluates the particular non-work-product document.

* * * * *